F. SCHAEFER.
BRAKE PIN.
APPLICATION FILED AUG. 19, 1915.
1,344,596.
Patented June 22, 1920.
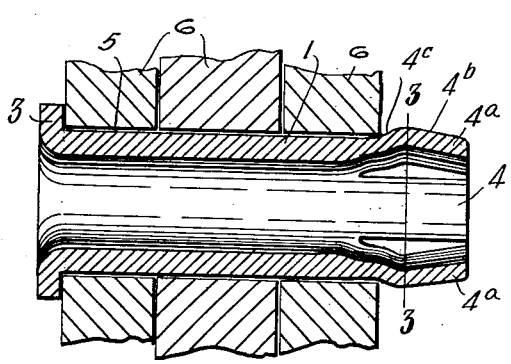
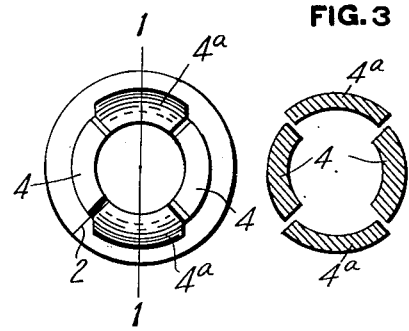
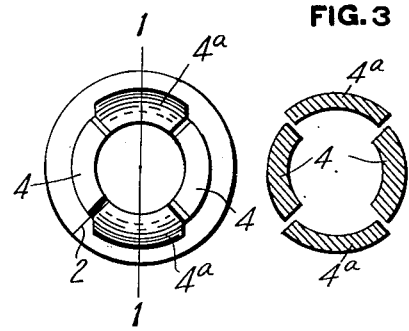
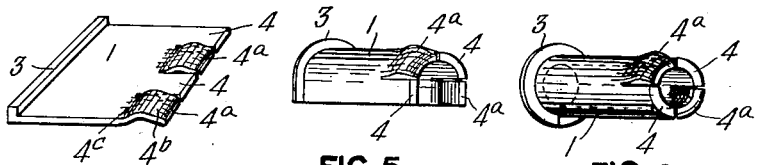
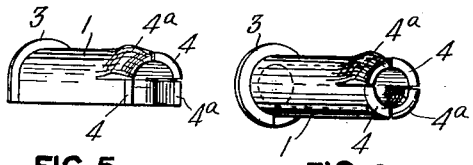
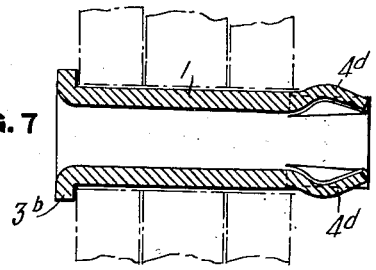
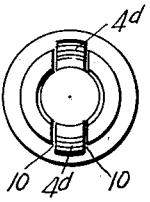
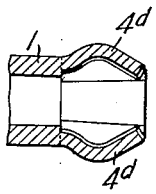
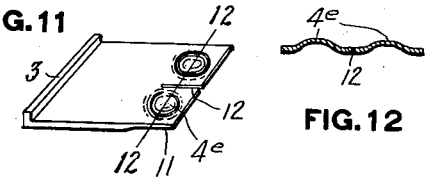
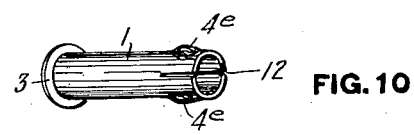
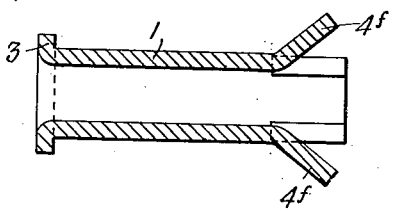
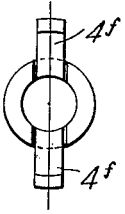
WITNESSES
INVENTOR
Frederic Schaefer
By Fredk W. Winter
his ATTORNEY

UNITED STATES PATENT OFFICE.

FREDERIC SCHAEFER, OF PITTSBURGH, PENNSYLVANIA.

BRAKE-PIN.

1,344,596.     Specification of Letters Patent.     Patented June 22, 1920.

Application filed August 19, 1915. Serial No. 46,316.

*To all whom it may concern:*

Be it known that I, FREDERIC SCHAEFER, a citizen of the United States, and a resident of Pittsburgh, in the county of Allegheny and State of Pennsylvania, have invented a new and useful Improvement in Brake-Pins, of which the following is a specification.

This invention relates to connecting pins such as are used for pivot pins in brake rigging, door mechanism or other parts of railway cars, in automobile mechanism and for other purposes and in other places. One object of the invention is to provide a simple form of securing or pivot pin which requires no cotter or other locking device, but is self-locking or retaining and can be easily inserted or removed when desired and will not escape in service. A further object of the invention is to provide a pin of this kind which can be readily manufactured by simple operations and on ordinary machines, and which is of maximum strength and durability for its size. Further objects of the invention are in part obvious and in part will appear more in detail hereinafter.

The invention comprises the pin hereinafter described and claimed.

In the drawings, Figure 1 represents a longitudinal sectional view on the line 1—1, Fig. 2, through one form of pin embodying the invention, and showing the same connecting certain parts to be secured to each other; Fig. 2 is an end view of the pin from the right in Fig. 1; Fig. 3 is a cross section on the line 3—3, Fig. 1; Figs. 4, 5 and 6 illustrate the manufacture of the pin shown in Fig. 1; Fig. 7 is a view corresponding to Fig. 1 and showing another form of the invention; Fig. 8 is an end view, from the right, of the pin shown in Fig. 7; Fig. 9 is a detail sectional view of another modification; Fig. 10 is a perspective view of another form of pin embodying the invention; Fig. 11 is a perspective view of the blank from which said pin is formed; Fig. 12 is a cross section on the line 12—12, Fig. 11; and Figs. 13 and 14 are respectively a longitudinal section and an end view of another form of pin.

The pin shown in the drawings consists of a tubular member having a shank or body 1 which may be split longitudinally at one side from end to end, as at 2, although this is not essential. At one end said shank or body is provided with an outwardly extending annular rib or flange 3. At its opposite end the tube is provided with one or a plurality of longitudinally extending tongues 4, which in Fig. 1 are formed by slitting the metal longitudinally for a short distance from its end to form a plurality of said tongues. Part or all of said tongues may be bent outwardly, and in the drawings four tongues are illustrated, two only of which, marked $4^a$, are bent outwardly beyond the outer surface of the tube wall to form resilient members, the opposite two being undisturbed continuations of the body or shank 1. The outwardly extending resilient members $4^a$ are preferably of reduced thickness, as shown in Fig. 3, so as to increase their resiliency and enable them to be more readily forced inwardly when inserting the pin into position. Each tongue $4^a$ is so bent as to form inclined front and rear faces $4^b$, $4^c$, which coöperate with the edges of the opening when the pin is inserted.

In Fig. 1 the pin lies in alined apertures 5 in several members 6 which may be any parts to be secured together, for example, some of the parts of the brake rigging of a car, which turn relatively to each other about said pin as a pivot, although the invention is not limited to this particular use. The pin is inserted into position by driving it in from one end, so that faces $4^b$ of the tongues $4^a$ engage the edges of the opening 5 and cause said tongues to spring inwardly and pass through the opening in the parts engaged. The pin is driven in until its rib or collar 3 abuts the outer surface of the outer member, in which position the tongues $4^a$ lie beyond the inner member 6, and spring outwardly to the position shown in Fig. 1 so that they lock the pin in place. These outwardly extending tongues or members are of sufficient thickness so that the pin will not escape during service but can be readily withdrawn by endwise force applied to its inner end.

The pin may be made in any suitable manner. For example, Fig. 4 shows a rolled or forged blank consisting of a flat metal sheet with the rib 3 along one edge thereof. This sheet is subjected at intervals to a die forging operation, either while rolling or forging the original blank, or subsequently, to thin the metal to form the tongues $4^a$, and the sheet is sawed or sheared inwardly from its edge to separate the tongues from each other. It is then rolled or bent to the form shown in Fig. 5 and is closed into tubular form, as shown in Fig. 6. At a suitable stage in the process the tongues 4ᵃ are bent outwardly into their final form.

The pin shown in Figs. 7 and 8 is made from a short section of continuous tubing, either welded or seamless tubing, so that there is no longitudinal slit extending from end to end, as in Fig. 1. In this form of device one end of the tube is forged, bent or rolled outwardly to form the rib or flange 3ᵇ. The other end of the tube may be thinned to provide the necessary resiliency in the yielding tongues in any suitable manner, either by turning down the metal, or by forging it, as desired. The reduction in thickness may be gradual, as in Fig. 8, or abrupt, as in Fig. 9. The resilient tongues which are bent outwardly, and which are indicated at 4ᵈ, are formed by sawing or slitting the tube longitudinally along two parallel planes, as indicated at 10, to separate the tongues 4ᵈ from the body of the shank or tube.

In Fig. 10 the outwardly extending resilient members are bosses, projections, or teats, 4ᵉ, punched or pressed outwardly from the body of the material. The end of the blank is thinned during the rolling operation or subsequently, as shown at 11, Fig. 11, and said blank may also be slitted longitudinally between the bosses or projections, as indicated at 12. In this form of device, when the pin is inserted, the teats or projections 4ᵉ engage the edges of the opening in the first member of the parts engaged or connected and force inwardly toward the center of the tube its thin end portions, which spring outwardly to original position when the pin is pushed fully home.

Figs. 13 and 14 illustrate another embodiment of the invention in which the resilient members are tongues 4ᶠ formed by slitting the metal of the tube longitudinally, said tongues being bent outwardly at an angle from the body of the tube, as shown. To insert this pin it is either necessary to bend the tongues 4ᶠ inwardly before introducing the pin into the openings in which it lies or the tongues may be bent outwardly to the form shown in Fig. 13, after inserting the pin. In either case the tongues extend beyond the edges of the opening through the parts engaged and lock the pin securely in position.

The pin described is of simple construction and locks itself in position so that it does not escape during service. At the same time it requires no cotters or other special locking devices. It is practically as strong as a solid pin of the same size and can be manufactured at low cost on ordinary machines, so that it is cheaper to maintain than the usual form of pin.

What I claim is:—

1. A pin of the class described, comprising a tubular member having an annular rib or flange at one end and at its opposite end provided with longitudinally extending tongues bent outwardly beyond the periphery of the tube, said tongues being of thinner metal than the tube walls.

2. A pin of the class described, comprising a tubular member having an annular rib or flange at one end and at its opposite end provided with longitudinally extending tongues bent outwardly beyond the periphery of the tube and having inclined front and rear faces, said tongues being of thinner metal than the tube walls.

3. A pin of the class described, comprising a tubular member having an annular rib or flange at one end and at its opposite end being slit longitudinally at intervals around its periphery to form tongues, at least one of said tongues being bent outwardly and extending beyond the outer periphery of the tube, the outwardly extending tongue being of thinner metal than the body of the tube.

In testimony whereof, I have hereunto set my hand.

FREDERIC SCHAEFER.

Witnesses:
 ELBERT L. HYDE,
 SUE B. FRITZ.